(12) United States Patent
Stahlin

(10) Patent No.: US 10,209,073 B2
(45) Date of Patent: Feb. 19, 2019

(54) LOCATION-DETERMINING DEVICE IN A MOTOR VEHICLE AND INFORMATION MERGING METHOD

(75) Inventor: Ulrich Stahlin, Eschborn (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 942 days.

(21) Appl. No.: 13/825,368

(22) PCT Filed: Sep. 7, 2011

(86) PCT No.: PCT/EP2011/065428
§ 371 (c)(1),
(2), (4) Date: Mar. 21, 2013

(87) PCT Pub. No.: WO2012/038250
PCT Pub. Date: Mar. 29, 2012

(65) Prior Publication Data
US 2013/0184990 A1  Jul. 18, 2013

(30) Foreign Application Priority Data
Sep. 23, 2010  (DE) ................. 10 2010 041 265

(51) Int. Cl.
*G01S 5/14* (2006.01)
*G01C 21/00* (2006.01)
(Continued)

(52) U.S. Cl.
CPC ............ *G01C 21/00* (2013.01); *G01S 19/35* (2013.01); *G01S 19/45* (2013.01); *B60R 11/04* (2013.01)

(58) Field of Classification Search
USPC ........................................... 701/469
See application file for complete search history.

(56) References Cited

U.S. PATENT DOCUMENTS

| 7,023,379 B2 | 4/2006 | Turnbull |
| 7,868,821 B2 | 1/2011 | Hoshizaki |
(Continued)

FOREIGN PATENT DOCUMENTS

| DE | 10 2008 020 446 A1 | 3/2009 |
| DE | 10 2007 058 192 A1 | 6/2009 |
(Continued)

OTHER PUBLICATIONS

Korean Search Report with translation dated Jul. 12, 2010.
(Continued)

*Primary Examiner* — Adam D Tissot
(74) *Attorney, Agent, or Firm* — Brinks Gilson & Lione

(57) ABSTRACT

The invention relates to a location-determining device in a motor vehicle which comprises at least one receiver device for receiving position signals and time signals for a multiplicity of satellites assigned to a global navigation system and a location-calculating module for calculating location information on the basis of received position data and time data. The location-Determining device is distinguished by the fact that the at least one receiver device is structurally integrated into the housing of an optical sensor unit, wherein the housing is arranged in a passenger compartment in a region of an upper edge of a windscreen, and wherein the housing does not have more than a single connection to a vehicle data bus and not more than a single connection to a vehicle energy supply.

14 Claims, 3 Drawing Sheets

(51) Int. Cl.
*G01S 19/35* (2010.01)
*G01S 19/45* (2010.01)
*B60R 11/04* (2006.01)

(56) References Cited

U.S. PATENT DOCUMENTS

| | | | |
|---|---|---|---|
| 2004/0196179 A1* | 10/2004 | Turnbull | G01S 5/0221 |
| | | | 342/357.75 |
| 2007/0171042 A1 | 7/2007 | Metes et al. | |
| 2008/0007882 A1 | 1/2008 | Bernard et al. | |
| 2010/0103040 A1* | 4/2010 | Broadbent | G01S 19/48 |
| | | | 342/357.28 |
| 2010/0176987 A1 | 7/2010 | Hoshizaki | |
| 2010/0250133 A1* | 9/2010 | Buros | G01S 19/48 |
| | | | 701/472 |

FOREIGN PATENT DOCUMENTS

| | | |
|---|---|---|
| DE | 10 2008 061 749 A1 | 6/2009 |
| JP | H10506202 A | 6/1998 |
| JP | H10506202 A | 6/1998 |
| KR | 2100094570 A | 8/2010 |
| WO | WO 96/09542 | 3/1996 |
| WO | WO 2009/074654 A1 | 6/2009 |
| WO | WO 2012/038250 A1 | 3/2012 |

OTHER PUBLICATIONS

PCT International Search Report—dated Dec. 14, 2011.
German Examination Report—dated Aug. 12, 2011.
Korean Office Action dated Aug. 13, 2018.

\* cited by examiner

LOCATION-DETERMINING DEVICE IN A MOTOR VEHICLE AND INFORMATION MERGING METHOD

CROSS-REFERENCE TO RELATED APPLICATIONS

This application claims priority to German Patent Application No. 10 2010 041 265.1, file Sep. 23, 2010 and PCT/EP2011/065428, filed Sep. 7, 2011.

FIELD OF THE INVENTION

The invention relates to a location determining device and to an information fusion method.

BACKGROUND OF THE INVENTION

The prior art discloses a multiplicity of different mono and stereo camera systems for use as ambient sensors in motor vehicle applications. On account of the diverse new opportunities which such camera systems provide in connection with driver assistance systems, they are becoming increasingly widespread. In this context, stereo camera systems are suitable not only for object identification but also, additionally, for distance determination. Similarly, navigation systems—which are usually designed on the basis of GPS—are also present as standard in more and more current vehicles. These navigation systems use received satellite signals to perform location determination and guide the driver to the destination along a journey route which is determined by means of a digital map. The more satellite signals the navigation system receives from as large a number of satellites as possible and the more distinctly these signals are received, the more exactly the location determination can be performed in this case.

Camera systems are usually arranged in the interior of the passenger space, as disclosed in DE 10 2008 061 749 A1, for example. The camera system described therein is mounted in front of the windshield on an upper cross connection of the A pillars. Here, there are good prerequisites for optical ambient identification on account of the field of vision, which is almost unrestricted in the direction of travel. At the same time, the view of the vehicle occupants through the windshield is not restricted or is restricted only a little. To avoid unwanted irradiation of light which enters the camera sensor system from outside a region that is to be monitored, the camera systems based on the prior art are also surrounded by what is known as stray-light protection.

DE 10 2008 020 446 A1 describes a correction apparatus for correcting an internally calculated vehicle position. A camera sensor or an ESP sensor system is used to identify a first position which corresponds to a prominent point on the journey route of the vehicle and to read the associated position from a memory unit. Furthermore, the correction apparatus comprises a position determining unit, e.g. based on GPS, for determining a second position of the vehicle. The ascertained second position can then be corrected using the ascertained first position.

In the course of constant improvement of information capture, information processing and hence also of the reliability of the information, the individual items of sensor information are being increasingly fused in the motor vehicle sector. In this connection, DE 10 2007 058 192 A1 discloses a central controller for a plurality of assistance systems which are provided in a motor vehicle and which, at least to some extent, are equipped with ambient sensors. The central controller is connected to the individual assistance systems at data level and checks the information from an ambient sensor using the information from other ambient sensors. By way of example, the image information from a camera can confirm the interval measurement from a radar sensor. Individual items of sensor information can therefore have a plausibility check performed for them and are available in redundant form. Such coupling of individual signals from different sensors is known as sensor fusion.

The satellite-assisted location determining devices for vehicle applications which are known from the prior art are firstly already subject to disadvantages on account of the known mounting locations for the reception apparatus for the satellite signals. On the basis of the prior art, the reception apparatuses are arranged either in the dashboard, on the roof, in the tailgate or in the side mirrors of the vehicle. In the first case, the propagation path for the signal from the satellite to the reception apparatus is disturbed by the vehicle roof, which results in reduced reception quality and hence reduced location accuracy. In the last three cases, although improved reception quality is available, this is associated with increased installation involvement and likewise increased cost involvement. Added to this are further installation involvement and cost involvement in so far as the location determining device is meant to be coupled to further vehicle sensors as part of increasingly customary sensor fusion.

It is therefore the object of the invention to propose a location determining device which combines comparatively little installation involvement with comparatively good reception quality for the satellite signals and in so doing is capable, without further installation involvement, of coupling the ascertained location information with information from at least one further sensor as part of sensor fusion.

The invention achieves this object by means of the location determining device and the information fusion method described herein.

INTRODUCTORY DESCRIPTION OF THE INVENTION

The location determining device according to the present invention in a motor vehicle comprises at least one reception apparatus for receiving position and time signals from a multiplicity of satellites associated with a global navigation system, and a location calculation module for calculating location information from received position and time data. The location determining device is distinguished in that the at least one reception apparatus is physically integrated in the housing of an optical sensor unit, wherein the housing is arranged in a region of an upper boundary of a windshield in a passenger space, and wherein the housing has no more than a single connection to each existing vehicle data bus type and no more than a single connection to a vehicle power supply. The integration of the reception apparatus in the housing of the optical sensor unit results first of all in the advantage of comparatively less installation involvement in comparison with separate and respectively individual installation of the optical sensor unit, the reception apparatus and the location calculation module in a vehicle. At the same time, the costs for installation are reduced. Particularly in respect of the optical sensor unit and the location determining device having a common connection to the vehicle power supply and communicating via a common connection to the vehicle data bus, there is resultant simplification and benefit for installation in the vehicle. If the vehicle contains different vehicle bus types, e.g. Flexray and CAN, the invention also allows the provision of a single connection to each vehicle data bus type. A further advantage, which above all improves the reliability and accuracy of the location determining device, is for the housing to be arranged in a region of an upper boundary of the windshield, for example in the vicinity of the rear view mirror. There, both comparatively good capture conditions in a region that usually needs to be monitored prevail for the optical sensor unit and comparatively good reception conditions prevail for the location determining device. This is advantageous particularly in view of the development of ever flatter windshields in order to reduce air resistance and the accompanying greater possible reception angles for the position and time signals—which are required for location calculation—from the satellites associated with the global navigation system.

Preferably, additionally the location calculation module is physically integrated in the housing. This results in the further advantage that the location calculation module also requires neither a separate connection to the vehicle power supply nor a separate connection to the vehicle data bus. This further reduces both the installation involvement and the cost involvement. In addition, the prerequisites are provided for comparatively easy-to-accomplish information fusion for the optical sensor unit and the location determining device, since the location calculation module is therefore also physically arranged in the housing of the optical sensor unit. Additional involvement for the data transmission between the optical sensor unit and the location calculation module which calculates the location information, such as cables or separate bus connections, is not needed.

With particular preference, the location calculation module is coupled to an image processing module of the optical sensor unit at data level, wherein particularly the location calculation module and the image processing module are fused to form a common electronic computation module. The coupling at data level allows information interchange and information fusion for the location calculation module and the image processing module. If the location calculation module and the image processing module are even fused to form a common electronic computation module, the information fusion is particularly effective, since all information is processed from the same computation module and hence no information interchange is required between different computation modules for the information fusion. This firstly improves the signal processing of the optical sensor, since reliable processing of the captured images requires the distance which the vehicle covers between two image capture operations to be taken into account. The distance covered can in turn be taken from the time derivation of the location information from the location determining device. In addition, information about the distance covered can also be taken from the driving dynamics sensors, but this information must first be transmitted via the vehicle data bus. Secondly, the information captured by the location determining device can be validated by means of the information from the optical sensor unit. By way of example, this allows simple identification and elimination of short-term measurement errors or disturbances in the location determining device. In addition, the camera can also be used to identify the ambient conditions, and the evaluation of the position and time signals from the satellites can be matched to these conditions. By way of example, it is thus possible to identify urban canyons, in which the number of receivable satellites is severely reduced in comparison with an overland journey.

Preferably, the device is distinguished in that the optical sensor unit is an inherently known mono or stereo camera module or a laser scanner and is particularly part of an inherently known driver assistance system. The use of such mono or stereo camera modules has been known for a long time and mono or stereo camera modules are present as standard in many vehicles as part of various driver assistance systems. Hence, additional installation and cost involvement disappears, since for the location determining device according to the invention it is possible to resort to an optical sensor unit which is present anyway. Usually, mono or stereo camera modules are used for the object identification and also—at least in the case of a stereo camera module—for the distance measurement.

On the basis of a further preferred embodiment of the invention, the location determining device is a GPS module, Galileo module, GLONASS module, Compass module or SBAS module. Said modules primarily differ from one another in terms of the frequency ranges used for sending the position and time signals and, regardless of their respective special features, can be used equally as a location determining device within the context of the invention.

Expediently, the windshield is not metalized in the region of the optical sensor unit and is not metalized particularly in the region of the reception apparatus. This first of all results in the advantage of an improved capture capability for the optical sensor unit. If the windshield is also not metalized in the region of the reception apparatus, the reception of the position and time signals sent by the satellites associated with the global navigation system is additionally improved. Otherwise, a proportion of the position and time signals sent would always be absorbed or reflected by the metallization.

Furthermore, it is advantageous that the optical sensor unit has at least one stray light protection element and particularly the at least one reception apparatus is physically integrated in the stray light protection element. The stray light protection element prevents the incidence of undesirable irradiation of light on the optical sensor unit, such as direct insulation or incident rays from outside the region that is to be monitored. The physical integration of the reception apparatus in the stray light protection element firstly improves the reception characteristics of the reception apparatus further, since it is not concealed by the stray light protection element. Secondly, the capture range of the optical sensor unit is not decreased by the reception apparatus, since the integration thereof in the stray light protection element means that it hides only those regions which it is undesirable to capture anyway. When a stereo camera is used as the optical sensor unit, integration in each of the two stray light protection elements is possible without restriction.

In addition, it is expedient that the at least one reception apparatus is physically integrated in a connecting section for two mono camera modules which form the stereo camera module. Depending on the individual design of the stereo camera module, integration in the connecting section may be linked to better reception characteristics for the reception apparatus in comparison with other mounting locations. In addition, simplifications may result for production.

The present invention also relates to an information fusion method for a location determining device in a motor vehicle, in which at least one reception apparatus is used to receive position and time signals from a multiplicity of satellites associated with a global navigation system and wherein location information is calculated from received position and time data by means of a location calculation algorithm. In addition, image information and/or interval information is/are captured by means of an optical sensor unit and processed by means of an image processing algorithm. The method according to the invention is distinguished in that at least the at least one reception apparatus and the optical sensor unit are connected to a vehicle data bus by means of a common connection and to a vehicle power supply by means of a common connection. The method according to the invention is therefore designed to be carried out in a location determining device according to the invention and results in the advantages already described in connection with the location determining device.

Preferably, additionally a location calculation module of the location determining device, which location calculation module performs the location calculation algorithm, is connected to the vehicle data bus by means of the common connection and to the vehicle power supply by means of the common connection. This simplifies and speeds up the method according to the invention, since all elements of the location determining device and all elements of the optical sensor unit are closely coupled to one another on account of the common connections, which promotes fast and effective information interchange.

With particular preference, the image processing algorithm and the location calculation algorithm are performed by a common electronic computation module, wherein particularly the location calculation module and an image processing module of the optical sensor unit, which module performs the image processing algorithm, are fused to form the common electronic computation module. The use of a common electronic computation module for executing both the location calculation algorithm and the image processing algorithm simplifies and speeds up the method according to the invention further, since all information is processed by the same electronic arithmetic unit. Information interchange between different arithmetic units, which is always connected to the involvement of computation time and computation power, is therefore not required.

In addition, it is advantageous that location information calculated by the location calculation algorithm, particularly time derivations from said location information, is used to improve processing of the image information by means of the image processing algorithm. The information about the distance covered by the vehicle between two image capture operations is used to improve the image processing. Hence, objects can be identified more certainly and more accurate information can be obtained from the processing of the image information.

In particular, it is advantageous that additionally driving dynamics sensor information is used to improve processing of the image information by means of the image processing algorithm. Information about the distance covered by the vehicle between two image capture operations can also be ascertained from the driving dynamics sensor information. This information can augment and correct the information from the location calculation algorithm, which results in a further improvement in the processing of the image information.

Expediently, the location information is validated and/or corrected by means of processed image information. This results in the advantage that the reliability of the location information can be improved. By way of example, it is possible to use the image information to identify whether the vehicle is at a junction, is traveling under a bridge or is in a tunnel. It is therefore a simple matter to validate and correct location information from the location calculation algorithm.

On the basis of a further preferred embodiment of the invention, the processed image information is used to determine prevailing reception conditions for the position and time signals, and particularly processing of the position and time signals is matched to the prevailing reception conditions. This allows the received position and time signals to be processed by the location calculation algorithm in a manner which is always correct with the situation and largely matched in optimum fashion. Thus, the image information allows identification of whether the vehicle is in an urban canyon on a densely built-up residential estate and the signal path to a particular number of satellites associated with the global navigation system is interrupted by buildings, for example. It is likewise possible to identify whether the vehicle is on a road with clear visibility from above and there are no interruptions in the signal paths from individual satellites. The matching of the processing of the received position and time signals allows location determination with comparatively greater accuracy and reliability.

BRIEF DESCRIPTION OF THE DRAWINGS

Further preferred embodiments can be found in the subclaims and in the description below of an exemplary embodiment with reference to figures, in which

DETAILED DESCRIPTION OF THE INVENTION

Figure 1:
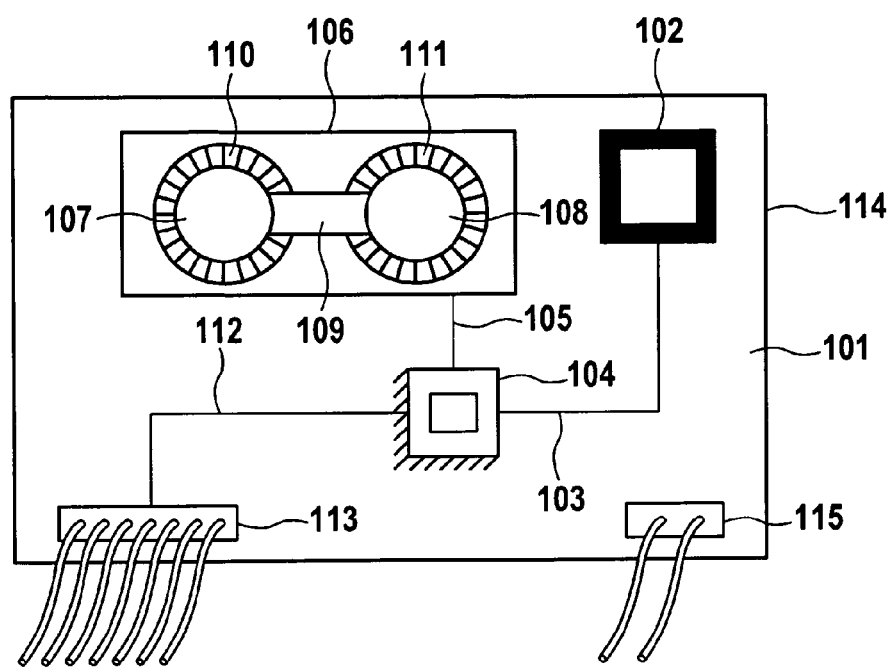
FIG. 1 shows the schematic illustration of a location determining device according to the invention.

FIG. 1 schematically shows a possible embodiment of a location determining device 101 according to the invention. Location determining device 101 comprises reception apparatus 102, which is designed to receive position and time signals from a multiplicity of satellites associated with a global navigation system. By way of example, reception apparatus 102 is a GPS antenna. Data line 103 connects reception apparatus 102 to electronic arithmetic unit 104. Electronic arithmetic unit 104 is a fused location calculation module and image processing module. Accordingly, electronic arithmetic unit 104 performs both a location calculation algorithm and an image processing algorithm. As a result, the image information is immediately available for use in the location calculation algorithm, and conversely it is possible for location information to be immediately made available to the image processing algorithm. Particularly the vehicle speed or the distance covered by the vehicle between two image capture operations by stereo camera module 106 is a piece of information which is essential to the image processing. Furthermore, data line 105 connects electronic arithmetic unit 104 to stereo camera module 106. Stereo camera module 106 comprises two single mono camera modules 107 and 108, which are physically connected by web 109. Since a stereo camera module is involved, not only is it generally possible to capture optical information, it is also possible to determine distances. In order to avoid undesirable irradiation of light into mono camera modules 107 and 108, they are provided with stray-light protection elements 110 and 111. Furthermore, electronic arithmetic unit 104 is connected to a vehicle data bus (not shown) by means of data line 112 using connection 113. Since all the components described are integrated in housing 114 of the stereo camera module, only one common connection 113 to the vehicle data bus is required for all components. Similarly, only one common connection 115 to the vehicle power supply is required for all components. The single power supply tracks of the elements surrounded by housing 114 are not shown for the sake of clarity.

The vehicle data bus can be used to transmit the image information and the location information and to make said information available to various vehicle systems and assistance devices. In this exemplary embodiment, the image information and the location information is respectively made available to an ADAS horizon, a navigation system, and a road works assistant. Furthermore, the vehicle data bus is used to transmit driving dynamics sensor information to electronic arithmetic unit 104, which uses said information in addition to the location information from the location calculation algorithm to improve the processing of the image information by the image processing algorithm. Housing 114 is arranged on the inside of the vehicle windshield at the level of the rear view mirror. This provides stereo camera module 106 with a largely optimum field of vision toward the front. In addition, it results in comparatively very good reception conditions for reception apparatus 102, since in this case there is usually an uninterrupted signal path to the satellites of the global navigation system. All in all, the integration of stereo camera module 106, reception apparatus 102 and common electronic arithmetic unit 104 in housing 114 therefore results in improved reception conditions for reception apparatus 102, in improved image processing by means of data fusion from stereo camera module 106 and reception apparatus 102 and in improved location determination. Finally, the installation involvement and the cost involvement are reduced, since a common connection 113 to the vehicle data bus and a common connection 115 to the vehicle power supply can be used for all elements surrounded by housing 114.

Figure 2:
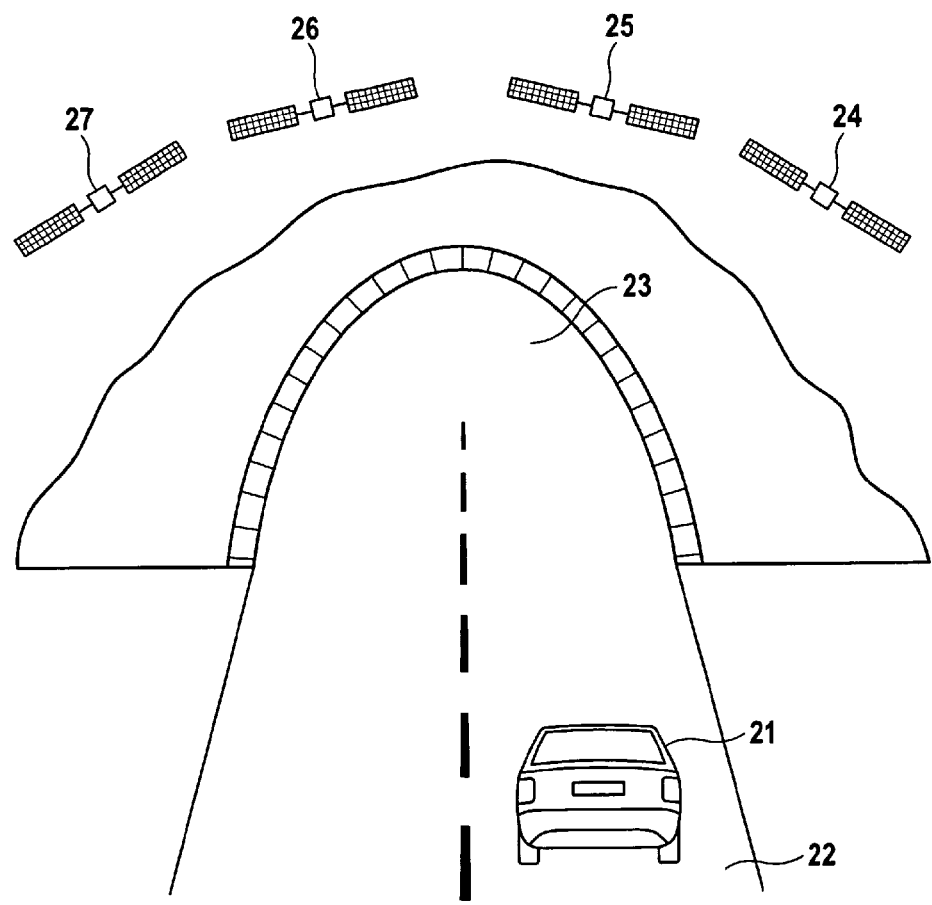
FIG. 2 shows a vehicle which is entering a tunnel and is equipped with the location determining device according to the invention.

FIG. 2 shows vehicle 21, which is equipped with a location determining device according to the invention (not shown). Vehicle 21 is traveling on road 22 in the direction of tunnel 23. So long as vehicle 21 is still ahead of tunnel 23 on road 22, the location determining device which is present in vehicle 21 receives the position and time signals emitted by satellites 24, 25, 26 and 27 in good quality. The mono camera module (likewise not shown) which is present in vehicle 21 identifies that vehicle 21 is entering tunnel 23. This information is taken into account for the evaluation of the received position and time signals. The location determining device therefore assumes that the signal quality of the available position and time signals is severely decreased when tunnel 23 is reached, or that the signals can no longer be captured. Accordingly, the location accuracy arising from the evaluation of the position and time signals is attributed less reliability. In the event of a complete interruption in the signal connection of satellites 24, 25, 26 and 27, the information that vehicle 21 is in tunnel 23 means that an error is not assumed for the location determining device.

Figure 3:
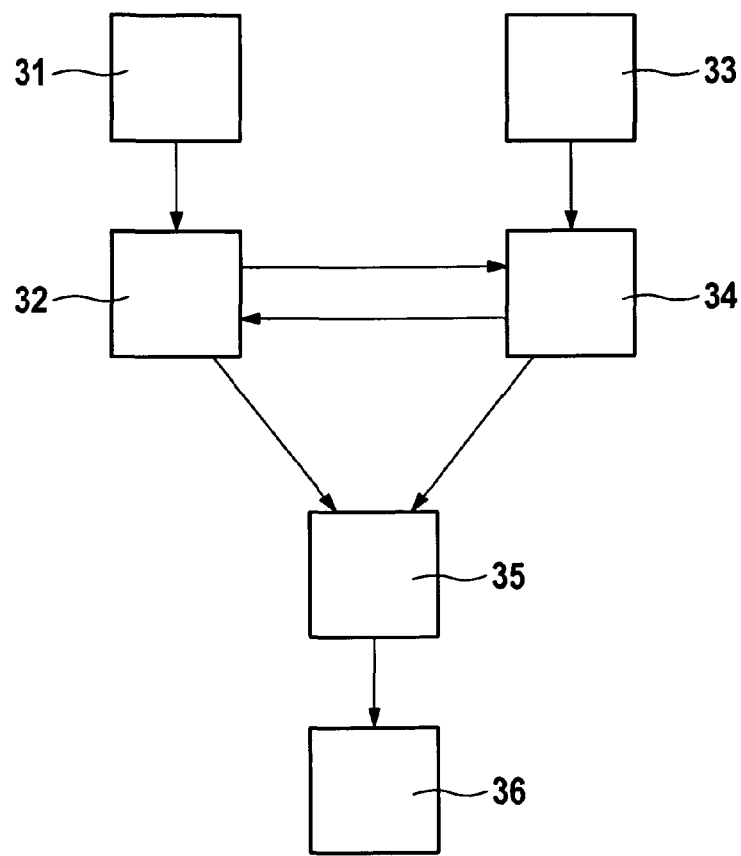
FIG. 3 shows an exemplary sequence for the method according to the invention in the form of a flowchart.

FIG. 3 shows an exemplary sequence for the method according to the invention in the form of a flowchart. First of all, a reception apparatus is used in step 31 to receive position and time signals from a multiplicity of satellites associated with a global navigation system. At the same time, image information is captured by means of an optical sensor unit in step 33. In method step 32, a location calculation algorithm calculates location information from the position and time signals received in step 31. In step 34, in parallel therewith, an image processing algorithm processes the image information captured in step 32. In addition, in steps 32 and 34, information interchange takes place between the image processing algorithm and the location calculation algorithm, said information interchange involving the use of time derivations for the location information to improve the image processing, and involving the use of processed image information to improve the location calculation. In step 35, the location information and the processed image information is fused, and in step 36, the fused location and image information is transmitted to further driver assistance systems and vehicle systems by means of the common connection to the vehicle data bus.

While the above description constitutes the preferred embodiment of the present invention, it will be appreciated that the invention is susceptible to modification, variation and change without departing from the proper scope and fair meaning of the accompanying claims.

The invention claimed is:

1. A location determining device in a motor vehicle, comprising:
   at least one reception apparatus for receiving position and time signals from a multiplicity of satellites associated with a global navigation system;
   a location calculation module for calculating location information from the received position and time signals, wherein the at least one reception apparatus is physically integrated in the housing of an optical sensor unit;
   the optical sensor unit configured to capture at least one image external of the motor vehicle;
   wherein the housing is arranged in a region of an upper boundary of a windshield in a passenger space of the motor vehicle;
   wherein the housing has no more than a single first connection to an existing vehicle data bus type and no more than a single second connection to a vehicle power supply;
   an electronic arithmetic unit in communication with the optical sensor unit, wherein the electronic arithmetic unit is configured to determine prevailing reception conditions for the position and time signals of the satellites associated with the global navigation system based on the at least one image, wherein the prevailing reception conditions indicate that the position and time signals of one or more of the satellites associated with the global navigation system are reduced by an interruption in signal paths from the satellites associated with the global navigation system to the motor vehicle in comparison to when there are no interruptions in signal paths from the satellites associated with the global navigation system to the motor vehicle; and
   wherein the electronic arithmetic unit is configured to match the position and time signals of the satellites associated with the global navigation system to the prevailing reception conditions based on the at least one captured image.

2. The device as claimed in claim 1, further comprising in that the location calculation module is physically integrated in the housing.

3. The device as claimed in claim 2, further comprising in that the location calculation module is coupled to an image processing module of the optical sensor unit at a data level, wherein p the location calculation module and the image processing module are fused to form a common electronic computation module.

4. The device as claimed in claim 1 further comprising in that the optical sensor unit is a mono or a stereo camera module, or a laser scanner and is part of a driver assistance system.

5. The device as claimed in claim 1 further comprising at least one of a GPS module, a Galileo module, a GLONASS module, a Compass module or a SBAS module.

6. The device as claimed in claim 1 further comprising in that the windshield is not metalized in the region of the optical sensor unit and is not metalized in the region of the at least one reception apparatus.

7. A location determining device in a motor vehicle, comprising:
at least one reception apparatus for receiving position and time signals from a multiplicity of satellites associated with a global navigation system;
a location calculation module for calculating location information from the received position and time signals, wherein the at least one reception apparatus is physically integrated in the housing of an optical sensor unit;
the optical sensor unit configured to capture at least one image external to the motor vehicle;
wherein the housing is arranged in a region of an upper boundary of a windshield in a passenger space of the motor vehicle;
wherein the housing has no more than a single first connection to an existing vehicle data bus type and no more than a single second connection to a vehicle power supply;
an electronic arithmetic unit in communication with the optical sensor unit, wherein the electronic arithmetic unit is configured to determine prevailing reception conditions for the position and time signals of the satellites associated with the global navigation system based on the at least one image, wherein the prevailing reception conditions indicate that the position and time signals of one or more of the satellites associated with the global navigation system are reduced by an interruption in signal paths from the satellites associated with the global navigation system to the motor vehicle in comparison to when there are no interruptions in signal paths from the satellites associated with the global navigation system to the motor vehicle;
wherein the electronic arithmetic unit is configured to match the position and time signals of the satellites associated with the global navigation system to the prevailing reception conditions; and
wherein the optical sensor unit has at least one stray light protection element and the at least one reception apparatus is physically integrated in the stray light protection element based on the at least one image.

8. The device as claimed in claim 1, further comprising in that the at least one reception apparatus is physically integrated in a connecting section for two mono camera modules which form a stereo camera module.

9. An information fusion method for a location determining device in a motor vehicle, comprising the steps of:
providing at least one reception apparatus having a processor, the processor being configured to receive position and time signals from a multiplicity of satellites associated with a global navigation system,
calculating by the processor location information from the received position and time signals by means of a location calculation algorithm,
providing to the processor at least one image external to the motor vehicle by means of an optical sensor unit, processing by the processor the at least one image by means of an image processing algorithm,
connecting at least the at least one reception apparatus and the optical sensor unit to a vehicle data bus by means of a common first connection and to a vehicle power supply by means of a common second connection,
wherein the at least one image is used to determine prevailing reception conditions of the satellites associated with the global navigation system, wherein the prevailing reception conditions indicate that the position and time signals of one or more of the satellites associated with the global navigation system are reduced by an interruption in signal paths from the satellites associated with the global navigation system to the motor vehicle in comparison to when there are no interruptions in signal paths from the satellites associated with the global navigation system to the motor vehicle, and
matching the position and time signals of the satellites associated with the global navigation system to the prevailing reception conditions based on the at least one image.

10. The method as claimed in claim 9, further comprising providing a location calculation module of the location determining device, which performs e of a location calculation algorithm, and connecting to the vehicle data bus by means of the second common connection and to the vehicle power supply by means of the first common connection.

11. The method as claimed in claim 10, c further comprising performing the image processing algorithm and the location calculation algorithm by a common electronic computation module, the location calculation module and an image processing module of the optical sensor unit, which electronic computation module performs the image processing algorithm, are fused to form the common electronic computation module.

12. The method as claimed in claim 9 further comprising in that location information calculated by the location calculation algorithm, and using time derivations from the location information, to improve processing of the image information by means of the image processing algorithm.

13. The method as claimed in claim 12, further comprising using additionally driving dynamics sensor information to improve processing of the image information by means of the image processing algorithm.

14. The method as claimed in claim 9 further comprising in that the location information is validated or corrected by means of processed image information.

* * * * *

UNITED STATES PATENT AND TRADEMARK OFFICE
CERTIFICATE OF CORRECTION

PATENT NO. : 10,209,073 B2
APPLICATION NO. : 13/825368
DATED : February 19, 2019
INVENTOR(S) : Ulrich Stahlin It is certified that error appears in the above-identified patent and that said Letters Patent is hereby corrected as shown below:

In the Claims

Column 10, Line 36, please delete the letter "c"

Signed and Sealed this
Sixteenth Day of April, 2019

Andrei Iancu
*Director of the United States Patent and Trademark Office*